US009027133B2

(12) United States Patent
Chen et al.

(10) Patent No.: US 9,027,133 B2
(45) Date of Patent: May 5, 2015

(54) METHOD AND SYSTEM FOR PERFORMING SECURITY MONITORING ON FILE DOWNLOADING

(71) Applicant: Tencent Technology (Shenzhen) Company Limited, Shenzhen, Guangdong (CN)

(72) Inventors: Qiru Chen, Shenzhen (CN); Yang Liu, Shenzhen (CN); He Li, Shenzhen (CN); Fei Lu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/074,066

(22) Filed: Nov. 7, 2013

(65) Prior Publication Data
US 2014/0068764 A1 Mar. 6, 2014

Related U.S. Application Data

(63) Continuation of application No. PCT/CN2013/081785, filed on Aug. 19, 2013.

(30) Foreign Application Priority Data

Aug. 30, 2012 (CN) .......................... 2012 1 0313865

(51) Int. Cl.
G08B 23/00 (2006.01)
G06F 21/55 (2013.01)
G06F 21/51 (2013.01)
G06F 21/56 (2013.01)

(52) U.S. Cl.
CPC ................ *G06F 21/55* (2013.01); *G06F 21/51* (2013.01); *G06F 21/562* (2013.01)

(58) Field of Classification Search
CPC .................... G06F 2203/04106; G06F 3/0416; G06F 3/048; G06F 21/00; H04N 21/24; H04N 21/442; H04N 21/44218; G11B 27/36; H04L 51/04; H04L 12/581

USPC .............. 726/22; 709/203; 718/101; 719/313
See application file for complete search history.

(56) References Cited

U.S. PATENT DOCUMENTS

2007/0022116 A1 * 1/2007 Smith ............................. 707/7
2008/0066180 A1 * 3/2008 Repasi et al. .................. 726/24
2009/0228716 A1   9/2009 Poston et al.

FOREIGN PATENT DOCUMENTS

CN         101924760 A   12/2010
CN         102004877 A    4/2011

OTHER PUBLICATIONS

State Intellectual Property Office of the People's Republic of China (ISR/CN), "International Search Report for PCT/CN2013/081785", China, Nov. 28, 2013.
Chunhua Cao, For Suspicious File Transmission Assistant Helps You Get Set Up, PC Fan, Sep. 1, 2010, No. 169, p. 75.

* cited by examiner

*Primary Examiner* — Brian Shaw
(74) *Attorney, Agent, or Firm* — Tim Tingkang Xia, Esq.; Morris, Manning & Martin, LLP

(57) ABSTRACT

The present invention discloses method and system for performing security monitoring on file downloading, and a non-transitory computer-readable medium that stores instructions for performing security monitoring on file downloading. The method includes upon detecting a file downloading operation, performing security detection on a downloaded file to determine whether the downloaded file is secure; if the downloaded file is secure, determining whether a downloading tool adopted when the file is downloaded is instant messenger (IM) software; and if the adopted downloading tool is IM software, modifying a filename extension of the downloaded file to ensure that the downloaded file is capable of being directly opened or run.

12 Claims, 4 Drawing Sheets

METHOD AND SYSTEM FOR PERFORMING SECURITY MONITORING ON FILE DOWNLOADING

CROSS-REFERENCE TO RELATED APPLICATIONS

This application is a continuation application of International Patent Application No. PCT/CN2013/081785, filed Aug. 19, 2013, which itself claims the priority to Chinese Patent Application No. 201210313865.4, filed Aug. 30, 2012 in the State Intellectual Property Office of P.R. China, which is hereby incorporated herein in its entirety by reference.

FIELD OF THE INVENTION

The present invention relates to the field of network security, and more particularly to method and system for performing security monitoring on file downloading and a non-transitory computer-readable medium that stores instructions to perform security monitoring on file downloading.

BACKGROUND OF THE INVENTION

Transferring files is a common channel through which a computer virus, such as Trojan, enters a user computer. Currently, a security monitoring system and monitoring method are used to perform security detection on a file downloaded to a client terminal, so as to prevent a computer virus from a source from entering a user computer.

In consideration of security of file transferring, when transferring a file, certain existing instant messenger (IM) software may rename the transferred file to prevent computer viruses, such as Trojan, from running automatically. Currently, when performing security detection on a file transferred through IM software, a security monitoring system and monitoring method only detect security of the transferred file, and inform a user of a security detection result. However, for a secure file, the user is not informed of how to use it, which incurs inconvenience to the user regarding the use, thereby failing to provide desirable user experience.

Therefore, a heretofore unaddressed need exists in the art to address the aforementioned deficiencies and inadequacies.

SUMMARY OF THE INVENTION

One of objectives of the present invention is to provides method and system for performing security monitoring on file downloading, and a non-transitory computer-readable medium that stores instructions to perform security monitoring on file downloading, so as to solve the problem existing in the existing network security technology.

In one aspect of the present invention, the method for performing security monitoring on file downloading according to an embodiment of the present invention includes: upon detecting a file downloading operation, performing security detection on a downloaded file to determine whether the downloaded file is secure; if the downloaded file is secure, determining whether a downloading tool adopted when the file is downloaded is IM software; and if the adopted downloading tool is IM software, modifying a filename extension of the downloaded file to ensure that the downloaded file is capable of being directly opened or run.

In another aspect of the present invention, the system for performing security monitoring on file downloading according to an embodiment of the present invention includes a detection module and a determination module. The detection module is used to, upon detecting a file downloading operation, perform security detection on a downloaded file to determine whether the downloaded file is secure. The determination module is used to, if the downloaded file is secure, determine whether a downloading tool adopted when the file is downloaded is IM software, and if the adopted downloading tool is IM software, modify a filename extension of the downloaded file to ensure that the downloaded file is capable of being directly opened or run.

In yet another aspect of the present invention, the non-transitory computer-readable medium storing instructions which, when executed by one or more processors, cause the foregoing disclosed system to perform the foregoing disclosed method for performing security monitoring on file downloading.

It can be seen from the aforementioned embodiments that, the present invention performs security detection on a downloaded file to determine whether the downloaded file is secure; if the downloaded file is secure, determines whether a downloading tool adopted when the file is downloaded is IM software; if the adopted downloading tool is IM software, modifies a filename extension of the downloaded file to ensure that the downloaded file can be directly opened or run, so that security in a file transfer process is ensured, and on the basis of that a user is informed of security, the user can directly open or run the file, so as not to affect use by the user, thereby making user experience more smooth.

The above illustration is only a summary of the technical solutions of the present invention. In order to enable the technical means of the present invention to be understood more clearly, implementation may be performed according to contents of the specification. In order to make the above and other objectives, features, and advantages of the present invention more comprehensible, detailed illustration is provided below through preferred embodiment with reference to the accompanying drawings.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
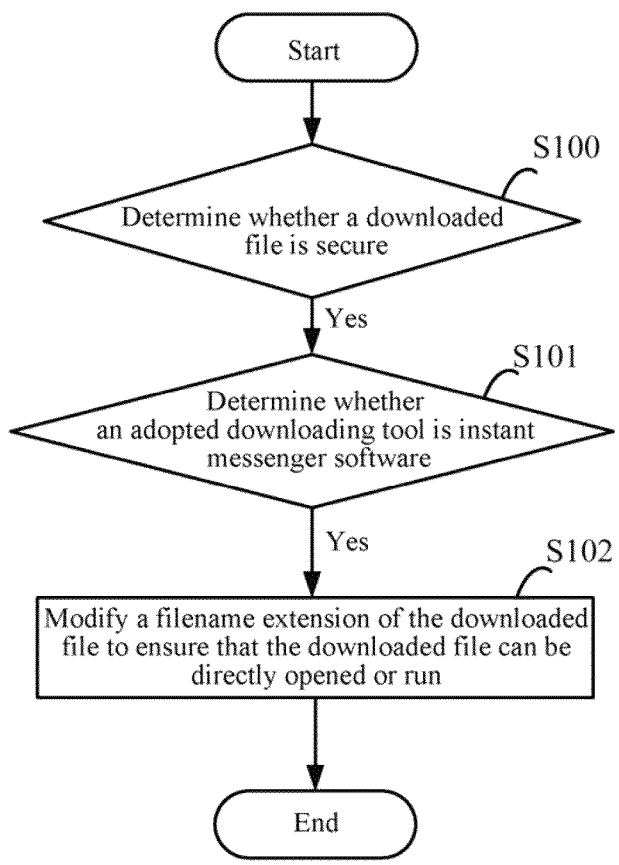
FIG. 1 is a flow chart of a method for performing security monitoring on file downloading according to an embodiment of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The description will be made as to the embodiments of the present invention in conjunction with the accompanying drawings in FIGS. 1-4. It should be understood that specific embodiments described herein are merely intended to explain the present invention, but not intended to limit the present invention. In accordance with the purposes of this invention, as embodied and broadly described herein, this invention, in one aspect, relates to method and system for performing security monitoring on file downloading, and a non-transitory computer-readable medium storing instructions which, when executed by one or more processors, cause the system to perform the method for performing security monitoring on file downloading.

To further illustrate the technical means adopted by the present invention to achieve the predetermined objective of the invention and the effects, a method and system for performing security monitoring on file downloading according to the present invention, and embodiments, structures, features, and effects thereof are illustrated in detail in the following with reference to the accompanying drawings and preferred embodiments.

The aforementioned and other technical contents, features, and effects of the present invention are clearly presented in the following detailed illustration of preferred embodiments below with reference to the reference drawings. Through illustration of the embodiments, the technical means adopted by the present invention to achieve the predetermined objective and the effects shall be understood more deeply and specifically. However, the accompanying drawings are only for reference and illustration, but are not intended to limit the present invention.

FIG. 1 is a flow chart of a method for performing security monitoring on file downloading according to an embodiment of the present invention. Referring to FIG. 1, the method for performing security monitoring on file downloading according to the embodiment of the present invention may include the following steps S100-S102.

At step S100: Upon detecting a file downloading operation, perform security detection on a downloaded file to determine whether the downloaded file is secure, and if the downloaded file is secure, perform step S101.

In this step, for example, when a user clicks a control for downloading a file on a network or performs an operation of downloading a file in another manner, this step detects the file downloading operation. When the security detection is performed on the downloaded file, it may be detected whether the downloaded file carries virus codes pre-stored in a virus database, so as to detect whether the downloaded file is secure. Specifically, if the downloaded file carries virus codes pre-stored in the virus database, it indicates that the downloaded file contains a virus and is not secure; otherwise, if the downloaded file does not carry virus codes pre-stored in the virus database, it indicates that the downloaded file is secure. p At step S101: If the downloaded file is secure, determine whether a downloading tool adopted when the file is downloaded is IM software, and if the adopted downloading tool is IM software, perform at step S102.

In this step, the IM software may be downloading tools such as Tencent QQ and Ali Wangwang.

At step S102: If the adopted downloading tool is IM software, modify a filename extension of the downloaded file to ensure that the downloaded file can be directly opened or run.

In this step, after the file is completely downloaded, a storage location of the downloaded file may be searched for before the filename extension of the downloaded file is modified. In consideration of security of file transfer, during transfer of an executable file or other files, IM software, such as Tencent QQ and Ali Wangwang, may rename the transferred file (for example, modify the filename extension of the downloaded file) to prevent a Trojan file in the downloaded file for running automatically. For example, when downloading a file, a Tencent QQ downloading tool may add ".rename" behind a filename extension of the downloaded file; when downloading a file, an Ali Wangwang downloading tool may add ".aliwangwang" behind a filename extension of the downloaded file. Therefore, in this step, in order to ensure that the downloaded file can be directly opened or run, the downloaded file needs to be renamed (to modify the filename extension of the downloaded file). For example, for a file downloaded through Tencent QQ, ".rename" is removed from the name of the file; for a file downloaded through Ali Wangwang, ".aliwangwang" is removed from the name of the file.

In the embodiment of the present invention, the present invention performs security detection on the downloaded file to determine whether the downloaded file is secure; if the downloaded file is secure, determines whether the downloading tool adopted when the file is downloaded is IM software; if the adopted downloading tool is IM software, modifies the filename extension of the downloaded file to ensure that the downloaded file can be directly opened or run, so that security in a file transfer process is ensured, and on the basis of that a user is informed of security, the user can directly open or run the file, so as not to affect use of the downloaded file by the user, thereby making user experience more smooth.

Figure 2:
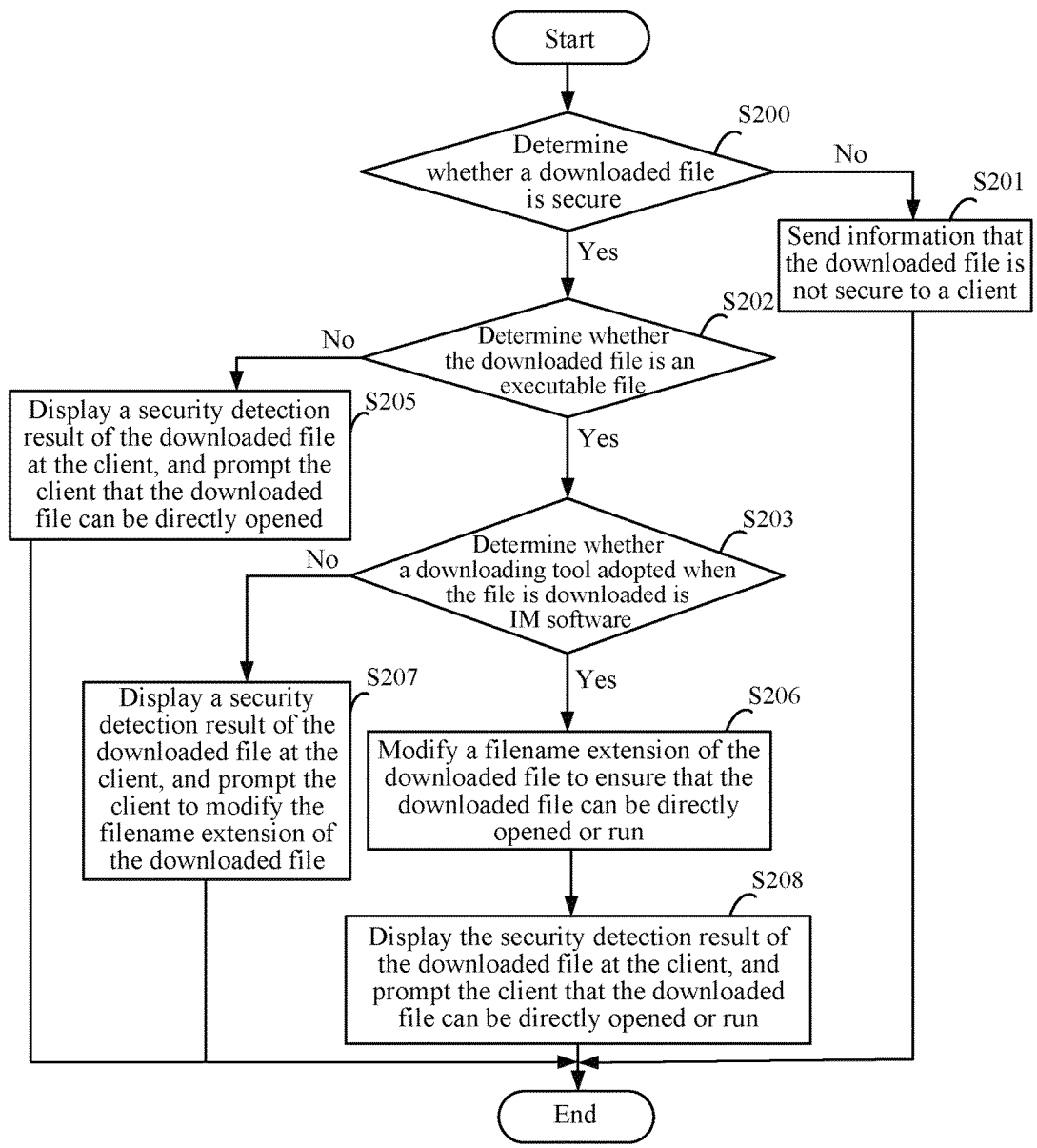
FIG. 2 is a schematic view of displaying a security detection result of a downloaded file at a client terminal according to an embodiment of the present invention.

FIG. 2 is a flow chart of a method for performing security monitoring on file downloading according to an embodiment of the present invention. FIG. 2 results from an improvement based on FIG. 1. Referring to FIG. 2, the method for performing security monitoring on file downloading according to the embodiment of the present invention may include the following steps S200-S208.

At step S200: Upon detecting a file downloading operation, perform security detection on a downloaded file to determine whether the downloaded file is secure, and if the downloaded file is secure, perform step S202.

In this step, for example, when a user clicks a control for downloading a file on a network or performs an operation of downloading a file in another manner, this step detects the file downloading operation. When the security detection is performed on the downloaded file, it may be detected whether the downloaded file carries virus codes pre-stored in a virus database, so as to detect whether the downloaded file is secure. Specifically, if the downloaded file carries virus codes pre-stored in the virus database, it indicates that the downloaded file contains a virus and is not secure; otherwise, if the downloaded file does not carry virus codes pre-stored in the virus database, it indicates that the downloaded file is secure.

Step S200 may specifically include a step: if the downloaded file is not secure, perform step S201.

At step S201: Send information that the downloaded file is not secure to a client terminal, and end.

At step S202: If the downloaded file is secure, determine whether the downloaded file is an executable file; if yes, execute step S203, and otherwise, execute step S205.

In this step, the executable file may be, for example, a file with a filename extension of the file being exe.

At step S203: Determine whether a downloading tool adopted when the file is downloaded is IM software; if yes, perform step S206, and otherwise, perform step S207.

In this step, the IM software may be downloading tools such as Tencent QQ and Ali Wangwang.

At step S205: If the downloaded file is not an executable file, display a security detection result of the downloaded file at the client terminal, prompt the client terminal that the downloaded file can be directly opened, and end.

In this step, if the downloaded file is not an executable file, information that the downloaded file is secure may be displayed at the client terminal, and an "open" control may be displayed at the client terminal, so as to prompt the client terminal that the downloaded file can be directly opened.

At step S206: If the adopted downloading tool is IM software, modify a filename extension of the downloaded file to ensure that the downloaded file can be directly opened or run, and perform step S208.

In this step, after the file is completely downloaded, a storage location of the downloaded file may be searched for before the filename extension of the downloaded file is modified. In consideration of security of file transfer, during transfer of an executable file or other files, IM software, such as Tencent QQ and Ali Wangwang, may rename the transferred file (for example, modify the filename extension of the downloaded file) to prevent a Trojan file in the downloaded file from running automatically. For example, when downloading a file, a Tencent QQ downloading tool may add ".rename" behind a filename extension of the downloaded file; when downloading a file, an Ali Wangwang downloading tool may add ".aliwangwang" behind a filename extension of the downloaded file. Therefore, in this step, in order to ensure that the downloaded file can be directly opened or run, the downloaded file needs to be renamed (to modify the filename extension of the downloaded file). For example, for a file downloaded through Tencent QQ, ".rename" is removed from the name of the file; for a file downloaded through Ali Wangwang, ".aliwangwang" is removed from the name of the file.

At step 5207: If the adopted downloading tool is not IM software, display a security detection result of the downloaded file at the client terminal, prompt the client terminal to modify the filename extension of the downloaded file, and end.

In this step, if the adopted downloading tool is not IM software, the information that the downloaded file is secure may be displayed at the client terminal, and information on how to modify the filename extension of the downloaded file may also be displayed at the client terminal, to prompt the client terminal that the client terminal can modify the filename extension of the downloaded file, so as to ensure that the downloaded file can be directly opened or run.

At step 5208: Display a security detection result of the downloaded file at the client terminal, and prompt the client terminal that the downloaded file can be directly opened or run.

Figure 3:
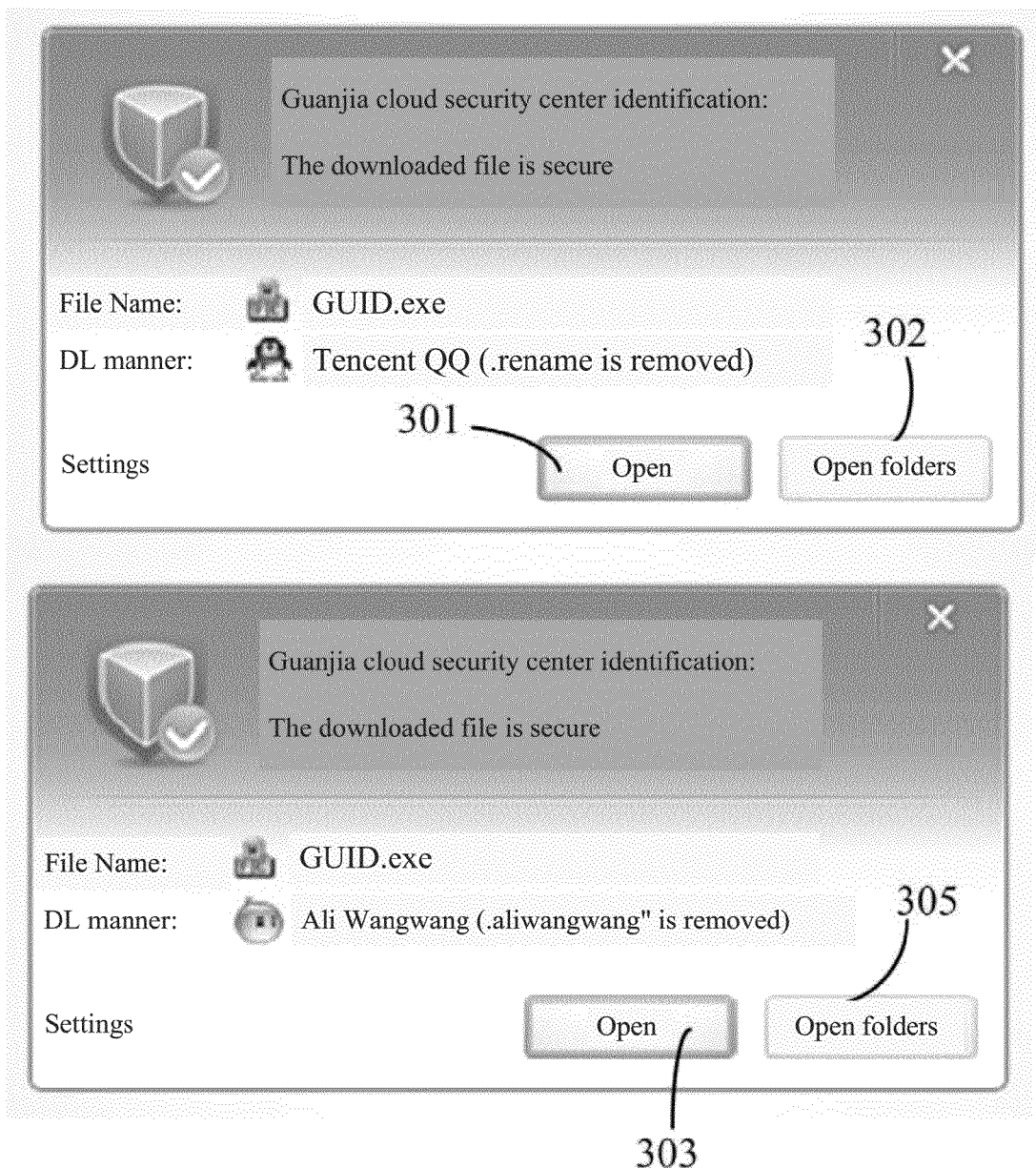
FIG. 3 is a flow chart of a method for performing security monitoring on file downloading according to another embodiment of the present invention.

In this step, illustration is provided by using FIG. 3 as an example. In FIG. 3, the information that the downloaded file is secure (for example in FIG. 3, the downloaded file is secure) is displayed at the client terminal, and the name and a downloading manner of the downloaded file are also displayed in FIG. 3. Open controls 301 and 303, and open folders 302 and 305 are also displayed at the client terminal, so as to prompt the client terminal that the downloaded file can be directly run or directly opened.

In the embodiment of the present invention, the present invention performs security detection on the downloaded file to determine whether the downloaded file is secure; if the downloaded file is secure, determines whether the downloaded file is an executable file; if yes, further determines whether the downloading tool adopted when the file is downloaded is IM software; if the adopted downloading tool is IM software, modifies the filename extension of the downloaded file to ensure that the downloaded file can be directly opened or run; if the downloaded file is not an executable file, displays the security detection result of the downloaded file at the client terminal, and prompts the client terminal that the downloaded file can be directly opened, so that security in a file transfer process is ensured, and on the basis of that a user is informed of security, the user is enabled to directly open or run the file under various determination results, so as not to affect use of the downloaded file by the user in any situation, thereby making user experience more smooth.

Figure 4:
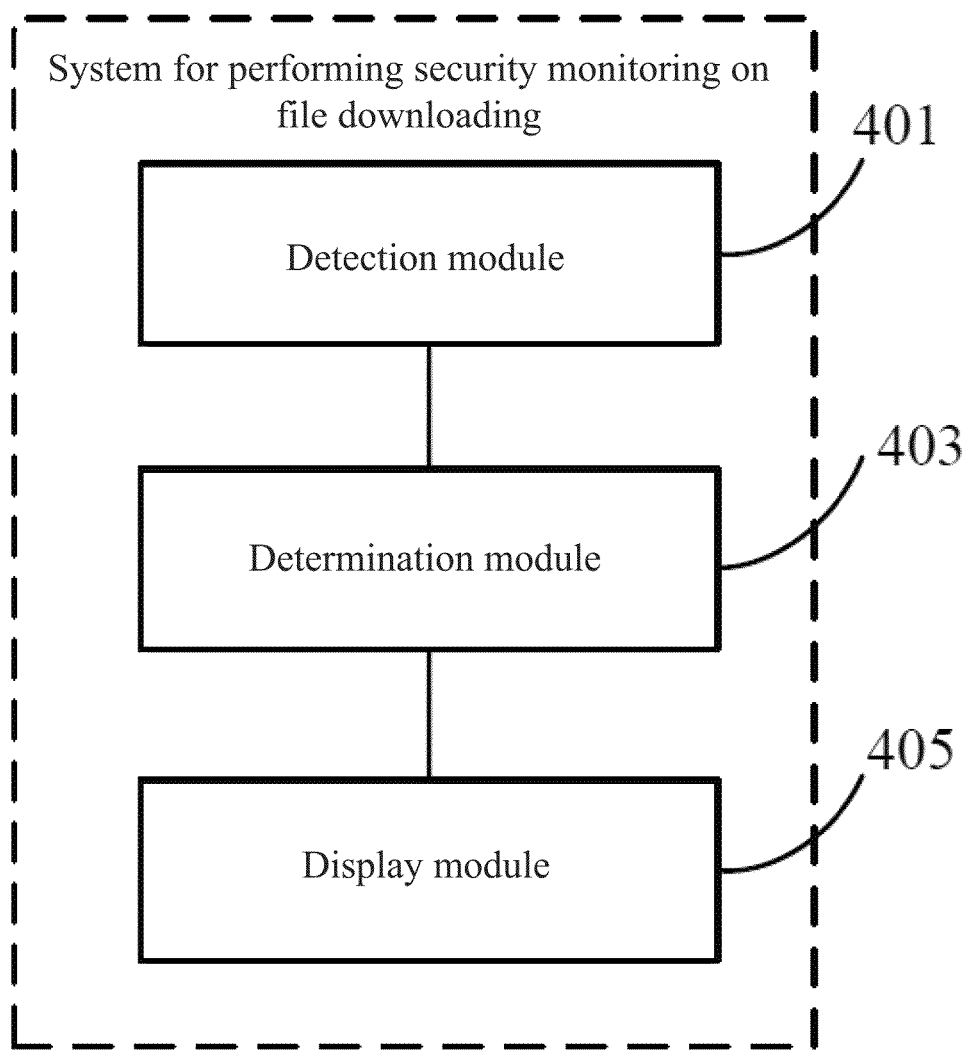
FIG. 4 is a block diagram of a main framework of a system for performing security monitoring on file downloading according to an embodiment of the present invention.

FIG. 4 is a block diagram of a main framework of a system for performing security monitoring on file downloading according to another embodiment of the present invention. Referring to FIG. 4, the system for performing security monitoring on file downloading includes: a detection module 401 and a determination module 403.

The detection module 401 may be disposed in a network server, and is used to, upon detecting a file downloading operation, perform security detection on a downloaded file to determine whether the downloaded file is secure. If the downloaded file is secure, the determination module is executed.

The detection module 401 is further used to, if the downloaded file is not secure, send information that the downloaded file is not secure to a client terminal.

The determination module 403 is used to, if the downloaded file is secure, determine whether a downloading tool adopted when the file is downloaded is IM software, and if the adopted downloading tool is IM software, modify a filename extension of the downloaded file to ensure that the downloaded file can be directly opened or run.

Further, the determination module 403 is further used to determine whether the downloaded file is an executable file; if the downloaded file is not an executable file, display a security detection result of the downloaded file at the client terminal, and prompt the client terminal that the downloaded file can be directly opened; if the downloaded file is an executable file, determine whether the downloading tool adopted when the file is downloaded is IM software.

Further, the determination module 403 is further used to, if the adopted downloading tool is not IM software, display the security detection result of the downloaded file at the client terminal, and prompt the client terminal to modify the filename extension of the downloaded file.

Further, the system for performing security monitoring on file downloading may further include a display module 405.

The display module 405 may be disposed at the client terminal. The display module 405 displays the security detection result of the downloaded file at the client terminal, and prompts the client terminal that the downloaded file can be directly opened or run.

In the embodiment of the present invention, the present invention performs security detection on the downloaded file to determine whether the downloaded file is secure; if the downloaded file is secure, determines whether the downloaded file is an executable file; if yes, further determines whether the downloading tool adopted when the file is downloaded is IM software; if the adopted downloading tool is IM software, modifies the filename extension of the downloaded file to ensure that the downloaded file can be directly opened or run; if the downloaded file is not an executable file, displays the security detection result of the downloaded file at the client terminal, and prompts the client terminal that the downloaded file can be directly opened, so that security in a file transfer process is ensured, and on the basis of that a user is informed of security, the user is enabled to directly open or run the file under various determination results, so as not to affect use of the downloaded file by the user in any situation, thereby making user experience more smooth.

In yet another aspect of the present invention, all of or a part of the procedure in the method according to the embodiments may be implemented by a computer program instructing relevant hardware. The program may be stored in a non-transitory tangible computer-readable medium. When the program is run, the procedure of the method according to the embodiments of the present invention is performed. The storage medium includes, but not limited to, a magnetic disk, an optical disk, a read-only memory (ROM), a random access memory (RAM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for performing security monitoring on file downloading, comprising:
   upon detecting a file downloading operation, performing security detection on a downloaded file to determine whether the downloaded file is secure;
   if the downloaded file is secure:
      determining whether a downloading tool adopted when the file is downloaded is instant messenger (IM) software; if the adopted downloading tool is IM software, modifying a filename extension of the downloaded file to ensure that the downloaded file is capable of being directly opened or run; and
      determining whether the downloaded file is an executable file; if the downloaded file is not an executable file, displaying a security detection result of the downloaded file at a client terminal, and prompting the client terminal that the downloaded file is capable of being directly opened; if the downloaded file is an executable file, determining whether the downloading tool adopted when the file is downloaded is IM software.

2. The method according to claim 1, wherein if the adopted downloading tool is IM software, the method further comprises:
   displaying a security detection result of the downloaded file at the client terminal, and prompting the client terminal that the downloaded file is capable of being directly opened or run.

3. The method according to claim 1, wherein if the downloaded file is secure, the method further comprises:
   if the adopted downloading tool is not IM software, displaying a security detection result of the downloaded file at the client terminal, and prompting the client terminal to modify the filename extension of the downloaded file.

4. The method according to claim 1, wherein upon detecting the file downloading operation, the method further comprises:
   if the downloaded file is not secure, sending information that the downloaded file is not secure to the client terminal.

5. A system for performing security monitoring on file downloading, comprising:
- a detection module, used to, upon detecting a file downloading operation, perform security detection on a downloaded file to determine whether the downloaded file is secure; and
- a determination module, used to:
  - if the downloaded file is secure, determine whether a downloading tool adopted when the file is downloaded is instant messenger (IM) software, and if the adopted downloading tool is IM software, modify a filename extension of the downloaded file to ensure that the downloaded file is capable of being directly opened or run; and
  - determine whether the downloaded file is an executable file; if the downloaded file is not an executable file, display a security detection result of the downloaded file at a client terminal, and prompt the client terminal that the downloaded file is capable of being directly opened; if the downloaded file is an executable file, determine whether a downloading tool adopted when the file is downloaded is IM software.

6. The system according to claim 5, further comprising:
- a display module, used to display a security detection result of the downloaded file at the client terminal, and prompt the client terminal that the downloaded file is capable of being directly opened or run.

7. The system according to claim 5, wherein the determination module is further used to, if the adopted downloading tool is not IM software, display a security detection result of the downloaded file at the client terminal, and prompt the client terminal to modify the filename extension of the downloaded file.

8. The system according to claim 5, wherein the detection module is further used to, if the downloaded file is not secure, send information that the downloaded file is not secure to the client terminal.

9. A non-transitory computer-readable medium storing instructions which, when executed by one or more processors, cause a system to perform a method for performing security monitoring on file downloading, the method comprising:
- upon detecting a file downloading operation, performing security detection on a downloaded file to determine whether the downloaded file is secure;
- if the downloaded file is secure:
  - determining whether a downloading tool adopted when the file is downloaded is instant messenger (IM) software; if the adopted downloading tool is IM software, modifying a filename extension of the downloaded file to ensure that the downloaded file is capable of being directly opened or run; and
  - determining whether the downloaded file is an executable file; if the downloaded file is not an executable file, displaying a security detection result of the downloaded file at a client terminal, and prompting the client terminal that the downloaded file is capable of being directly opened; if the downloaded file is an executable file, determining whether the downloading tool adopted when the file is downloaded is IM software.

10. The non-transitory computer-readable medium according to claim 9, wherein if the adopted downloading tool is IM software, the method further comprises:
- displaying a security detection result of the downloaded file at the client terminal, and prompting the client terminal that the downloaded file is capable of being directly opened or run.

11. The non-transitory computer-readable medium according to claim 9, wherein if the downloaded file is secure, the method further comprises:
- if the adopted downloading tool is not IM software, displaying a security detection result of the downloaded file at the client terminal, and prompting the client terminal to modify the filename extension of the downloaded file.

12. The non-transitory computer-readable medium according to claim 9, wherein upon detecting the file downloading operation, the method further comprises:
- if the downloaded file is not secure, sending information that the downloaded file is not secure to the client terminal.

* * * * *